United States Patent
Haciomeroglu et al.

(10) Patent No.: US 9,933,332 B2
(45) Date of Patent: Apr. 3, 2018

(54) DYNAMOMETER ROTARY TABLE

(71) Applicant: FORD OTOMOTIV SANAYI ANONIM ŞIRKETI, Istanbul (TR)

(72) Inventors: Idris Haciomeroglu, Kocaeli (TR); Selcuk Celikel, Kocaeli (TR); Sevket Emre Oz, Kocaeli (TR); Fethi Semih Ozkan, Kocaeli (TR); Alper Tekeli, Kocaeli (TR); Ergun Guraslan, Kocaeli (TR)

(73) Assignee: FORD OTOMOTIV SANAYI ANONIM SIRKETI, Istanbul (TR)

( * ) Notice: Subject to any disclaimer, the term of this patent is extended or adjusted under 35 U.S.C. 154(b) by 156 days.

(21) Appl. No.: 14/916,188

(22) PCT Filed: Sep. 2, 2014

(86) PCT No.: PCT/TR2014/000340
§ 371 (c)(1),
(2) Date: Mar. 3, 2016

(87) PCT Pub. No.: WO2015/034451
PCT Pub. Date: Mar. 12, 2015

(65) Prior Publication Data
US 2016/0195452 A1    Jul. 7, 2016

(30) Foreign Application Priority Data

Sep. 3, 2013   (TR) ............... a 2013 10389
Aug. 29, 2014   (TR) ............... a 2014 10133

(51) Int. Cl.
*G01M 15/00*   (2006.01)
*G01M 13/02*   (2006.01)
(Continued)

(52) U.S. Cl.
CPC .......... *G01M 13/025* (2013.01); *G01M 15/02* (2013.01); *G01L 3/02* (2013.01)

(58) Field of Classification Search
CPC ... G01M 13/025; G01M 15/02; G01M 15/044
(Continued)

(56) References Cited

U.S. PATENT DOCUMENTS 4,199,979 A * 4/1980 Herr, Jr. ................... F16D 1/10
                                                        73/116.05
7,921,712 B1 * 4/2011 Rindler ................. G01M 13/02
                                                        73/116.05
(Continued)

FOREIGN PATENT DOCUMENTS

CN     102928233 A    2/2013
GB      2078984 A    1/1982
(Continued)

OTHER PUBLICATIONS

"Table elevatrice pheumatique a niveau constant", Jan. 17, 2012,URL: https://www.youtube.com/watch?v=3_p3xm4hiBo.

*Primary Examiner* — Benjamin Schmitt
(74) *Attorney, Agent, or Firm* — Gokalp Bayramoglu

(57) ABSTRACT

The present invention relates to a dynamometer rotary table (1), which brings the dynamometer to the required position according to the test that will be conducted automatically or manually. The dynamometer rotary table (1) is mounted to the ground via a fixed plate (2). An inner table (4) is seated on the fixed plate (2), and there are lifters (5) on the inner table. The lifters (5) lift the rotary table (6), and the rotary table (6) is brought to the desired position by means of the reducer (3). The lifters (5) lower the rotary table (6) to its new position, and the lock unit (8) fixed the rotary table (6) at its new position.

24 Claims, 3 Drawing Sheets

(51) Int. Cl.
*G01M 15/02* (2006.01)
*G01L 3/02* (2006.01)

(58) Field of Classification Search
USPC .... 73/116.01, 116.02, 116.05, 862, 862.381, 73/862.541
See application file for complete search history.

(56) References Cited

U.S. PATENT DOCUMENTS

| | | | |
|---|---|---|---|
| 8,505,374 B1 * | 8/2013 | Arseneau | G01L 3/24 73/116.05 |
| 2003/0107384 A1 | 6/2003 | Ranchin et al. | |

FOREIGN PATENT DOCUMENTS

| | | |
|---|---|---|
| JP | S62197741 A | 9/1987 |
| KR | 101282300 B1 | 7/2013 |

* cited by examiner

DYNAMOMETER ROTARY TABLE

FIELD OF THE INVENTION

The present invention relates to a dynamometer rotary table which enables the dynamometer to rotate manually or automatically in order for the dynamometer to operate in different positions.

BACKGROUND OF THE INVENTION

A dynamometer is used for measuring the output force of a rotary machine. The dynamometer is used for measuring the horse power of an energy motor or an automobile engine. Multiplication of the momentum (torsion force) applied to the rotary member and the angular velocity gives the force. The most commonly used dynamometer measuring force is comprised of an elastic metal ring. When a force is loaded such that it will compress this ring, the ring is torsioned and the force is measured according to the amount of torsion. The greater the force applied by the object, the more the spring is stretched.

Noise, Vibration and Harshness (NVH) performance of engines is very important in terms of the customer and environmental comfort. Particularly NVH performance of the engines used in automobiles should be within a determined limit. When the vibration and noise generated by the engine exceeds a specific limit, it directly affects the driving comfort and environment. To this end, many studies and tests for improving NVH performance of engines are conducted intensely. In order to measure the noise and vibration levels during these tests, engines are located in acoustically insulated special test rooms. In these tests dynamometers are used in order to be able to apply load on the engines. Dynamometers should not be located in acoustic chambers. Dynamometers are located in the rooms which are adjacent to the acoustic chamber, in order to prevent the reflection of the sound waves generated by the engine from the outer surfaces of the dynamometer and to prevent the noise generated by the dynamometers. However this means that the dynamometers can only be used in NVH development tests.

In current applications, the dynamometer rooms are not designed as separate test cells. Even if the dynamometer rooms are designed as separate test cells, dynamometers should to be dismantled and repositioned after NVH tests are completed, and after repositioning is finished mechanical development test can be conducted. Dismantling and repositioning the dynamometers causes loss of time and labor; and furthermore, the test cells cannot be used during this period either. There is no structure or a system which enables the dynamometer to be automatically rotated according to the test that will be conducted and bringing it to a required position for the other test or wherein the base on which the dynamometer is seated moves automatically.

The Japanese patent document no JPS62197741 (A), an application known in the state of the art, discloses about calculation of the noise and vibration tests according to the revolutions of the front and rear shafts. The said invention does not disclose that the dynamometer can be located on a rotary table and that its position can be changed automatically.

The Great Britain patent document no. GB2078984 (A), an application in the state of the art, discloses a dynamometer for testing internal combustion engines. On the test arrangement, an input coupling is rotatable about an axis and connected to the engine. The said invention does not disclose that the dynamometer can be located on a rotary table and that its position can be changed automatically.

The state of the art applications do not disclose a structure having a rotary table, which manually or automatically changes the position of the dynamometer for the vibration and mechanical tests without dismantling it, and which automatically brings the dynamometer to the position that is required for the next test.

SUMMARY OF THE INVENTION

An objective of the present invention is to provide a dynamometer rotary table which can manually or automatically bring the dynamometer to the required position according to the test that will be conducted.

Another objective of the present invention is to provide a dynamometer rotary table which, when the NVH development tests are not conducted, brings the dynamometer to the required position for the mechanical development tests.

A further objective of the present invention is to provide a dynamometer rotary table which automatically brings the dynamometer to the required configuration according to the test that will be conducted.

Another objective of the present invention is to provide a dynamometer rotary table which can perform transitions between the configurations rapidly within the determined time range.

A dynamometer rotary table; which is developed to fulfill the objective of the present invention, and which is defined in the first claim and the claims dependent thereon; carries the dynamometer and automatically changes the position of the dynamometer according to the test that will be conducted. The dynamometer is located on a carrier and this carrier is mounted on a rotary table. The rotary table is seated on an inner table and moves on the fixed table together with the inner table. There are carriers (sliders) between the inner table and the fixed table. The carriers enable to reduce friction force and facilitate movement. The lifter and the reducer enable the rotary table to be lifted up and to be rotated towards the desired direction. The dynamometer is automatically or manually rotated together with the rotary table and the inner table, brought to the desired position, and fixed. Thus, the dynamometer is positioned according to the test that will be conducted.

BRIEF DESCRIPTION OF THE DRAWINGS

A dynamometer rotary table developed to fulfill the objective of the present invention is illustrated in the accompanying figures wherein.

Figure 1:
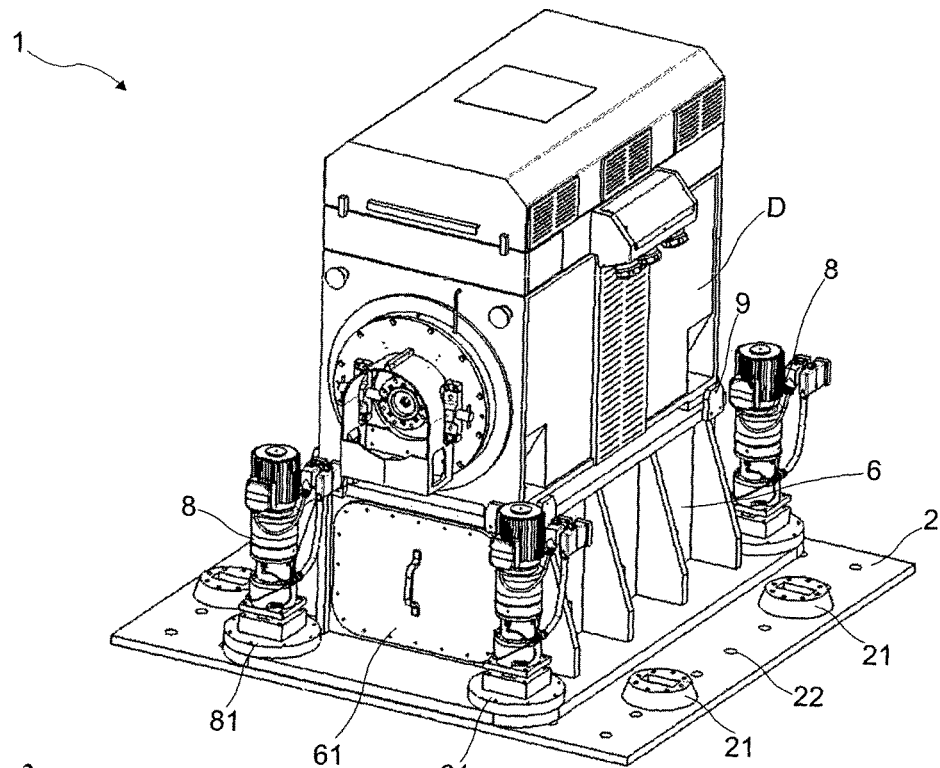
FIG. 1 is the perspective view of the dynamometer rotary table.
Figure 2:
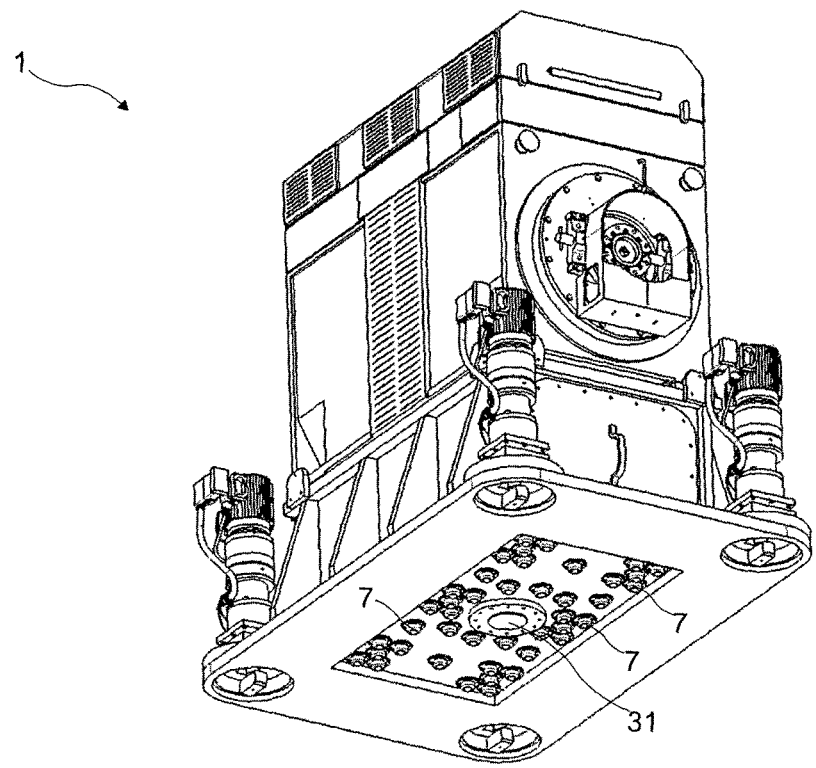
FIG. 2 is the perspective view of the dynamometer rotary table from a different angle.
Figure 3:
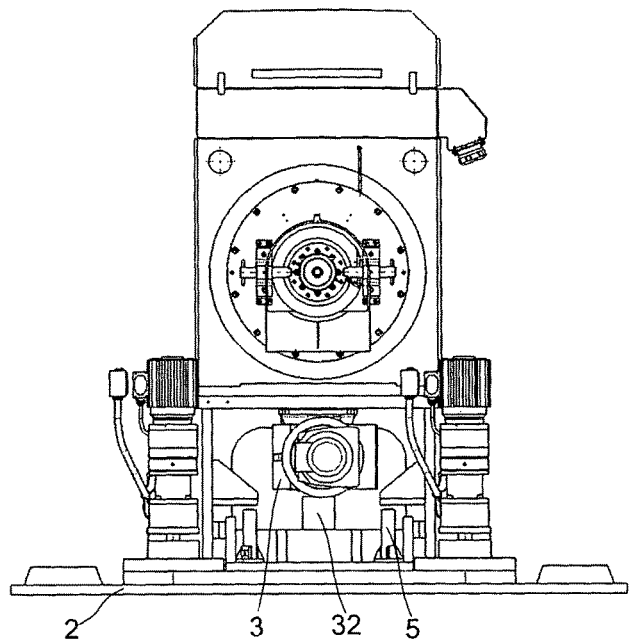
FIG. 3 is the side view of the dynamometer rotary table.
Figure 4:
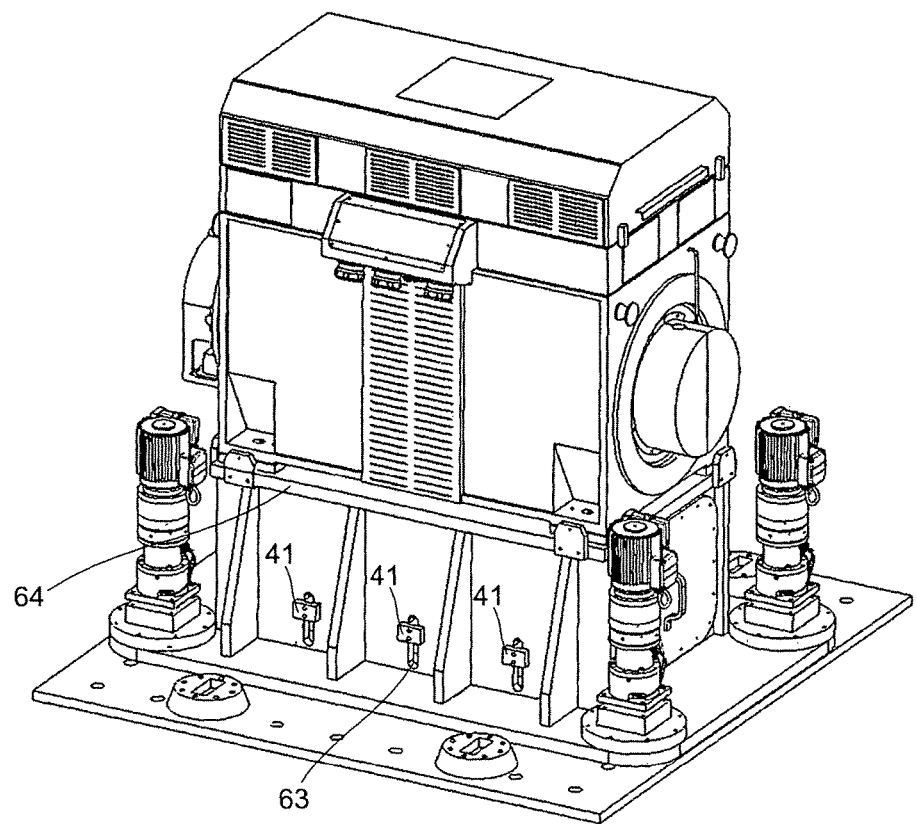
FIG. 4 is the perspective view of the dynamometer rotary table from a different angle.

The components shown in the figures are each given reference numbers as follows:
10. Dynamometer rotary table
11. Fixed plate
   21. Fixing and centering member
   22. Mounting hole
12. Shaft and reducer
   31. lower fixing member of the shaft 32. upper fixing member of the shaft
13. Inner table
    41. Guiding member
14. Lifter
15. Rotary table
    61. Service window
    62. Lifting piece
    63. Guide slot
    64. Upper cover
    65. Support member
16. Slider
17. Lock unit
    81. Connecting member
18. Positioning bolt
D. Dynamometer
K. Control unit (not shown in the figures)

DETAILED DESCRIPTION OF THE INVENTION

A dynamometer rotary table (1), which brings the dynamometer to the required position according to the test that will be conducted, comprises at least one fixed plate (2) which is seated on the ground,
    at least one shaft and reducer (3) which generate the rotation force and enables rotation,
    at least one rotary table (6) which changes position of the dynamometer by rotating.

The dynamometer rotary table (1) of the present invention is placed on the ground by means of the fixed plate (2). The fixed plate (2) is stationary and provides a leveled and balanced surface relative to the ground. The fixed plate (2) comprises fixing and centering members (21) and mounting holes (22). The fixing and centering members (21) are mounted on the fixed plate (2) according to the positions that the dynamometer (D) will be located. Desired numbers of mounting holes (22) are located at desired locations on the fixed plate (2). This fixed plate (2) is fixed to the ground by means of these mounting holes (22). If necessary, additional fixing and centering members (21) can be mounted on the fixed plate (2). A conical piece preferably having a slot thereon is used as the fixing and centering member (21) (FIG. 1). The fixed plate (2) may be of different geometries. The fixed plate (2) preferably has a quadrilateral, circular or elliptical geometry. In an alternative embodiment of the invention, at the bottom of the fixed plate (2) there are feet whose heights can be adjusted. This way, the fixed plate (2) is enabled to form a flat surface.

Preferably lower fixing member of the shaft (31) and upper fixing member of the shaft (32) are mounted on the fixed plate (2). The lower fixing member of the shaft (31) is preferably mounted on the fixed plate (2) and the upper fixing member of the shaft (32) is preferably mounted on the lower fixing member of the shaft (31). Thus, the shaft and reducer (3) are mounted to the fixed plate (2) by means of the fixing members (31, 32). The shaft and reducer (3) are mounted on the lower and upper fixing members (31, 32). The shaft and reducer (3) provide the force which is necessary for the rotation and convert this force into a rotational movement. In an alternative embodiment of the invention, different drive mechanisms are used instead of the shaft and reducer (3).

Figure 5:
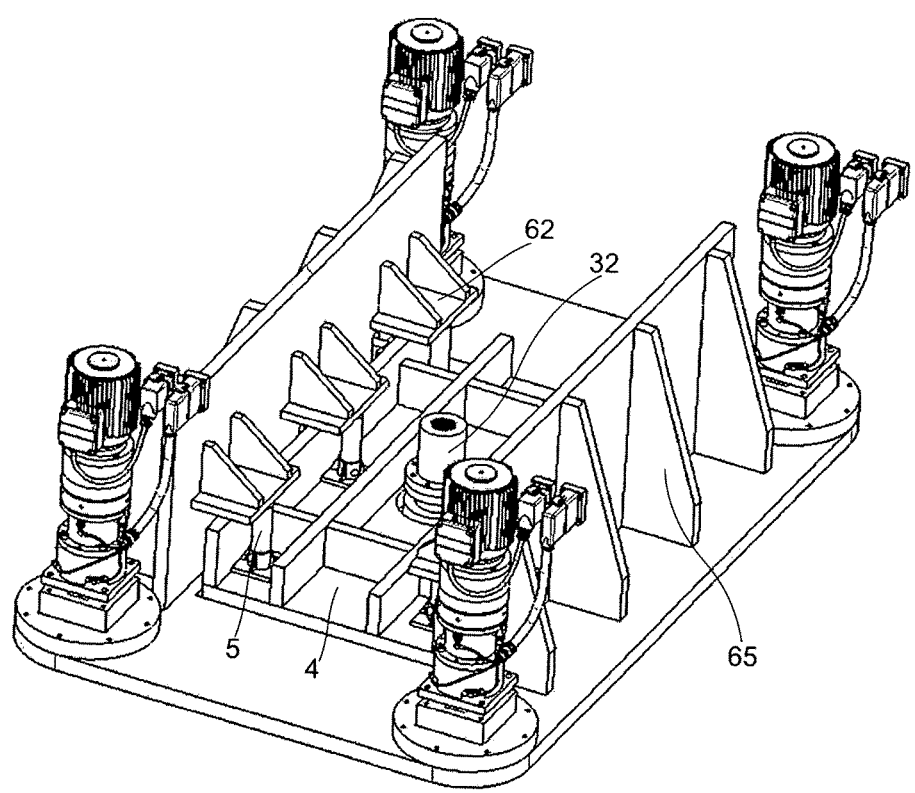
FIG. 5 is the perspective view of the fixed plate and inner table.

Preferably the inner table (4) is seated on the fixed plate (2). The inner table (4) is located between the fixed plate (2) and the rotary table (6) and moves together with the rotary table (6). The inner table (4) may have different geometries; it preferably has a quadrilateral, circular or elliptical geometry. The inner table (4) preferably has at least one guiding member (41). The guiding member (41) is used for other parts to move synchronized relative to the movement of the inner table. The inner table (4) is preferably seated on the fixed plate (2) with respect to the center of the fixed plate (2). There is a slot on the inner table (4) through which the lower and upper fixing members of the shaft (31, 32) pass. The fixing members of the shaft (31, 32) pass through this slot. The inner table (4) is not fixed on the fixed plate (2) and can be rotated by applying a force. The inner table (4) may be divided into sections, and thus the parts to be placed thereon are enabled to be grouped easily and its strength is enhanced. In one embodiment of the invention, the inner table (4) is divided into vertical and horizontal sections and preferably has walls on two or four sides thereof which are perpendicular to the ground (FIG. 5).

At least one lifter (5) is fixed on the inner table (4). The lifters (5) lift the load placed thereon to the preferred height and lower it. The lifters (5) operate preferably automatically or manually. The lifters (5) lift the load acting on them to a preferred height according to the drive or signal that they receive, and keep the load at this height until they receive a drive or signal again. When the lifters (5) receive the signal of lowering the load, they lower the load back to its original level. Different mechanical structures can be used as lifters (5). In the preferred embodiment of the invention, a hydraulic or pneumatic piston is used as a lifter (5). The number of lifters (5) may change according to the weight and shape of the load that is lifted. In the preferred embodiment of the invention, at least four lifters (5) are mounted at parts near the vertical or long sides of the inner table (4). The number of lifters (5) can be easily reduced or increased according to the weight and balance of the load.

The rotary table (6) is seated on the fixed plate (2) and inner table (4). The rotary table (6) is seated on the fixed plate (2). The rotary table (6) moves on the fixed plate (2) with the momentum it receives from the shaft and reducer (3) unless there is any locking. In the preferred embodiment of the invention, the rotary table (6) moves on the fixed plate (2) together with the inner table (4).

The rotary table (6) may have different geometries. In the preferred embodiment it may be quadrilateral, circular or elliptical. The rotary table (6) preferably has at least one service window (61). By means of the service window (61), the inside of the rotary table (6) can be accessed and mechanical maintenance procedures can be performed easily. (FIG. 5)

The rotary table (6) preferably has at least one lifting piece (62). The lifting piece (62) is preferably located on the side walls of the rotary table (6). The lifting piece (62) is seated on the inner table (4) and lifters (5). The lifting force applied by the lifters (5) is transferred to the rotary table (6) via the lifting pieces (62). The numbers and locations of the lifting pieces (62) may be different according to the number of lifters (5) and the weight and balance of the load. (FIG. 5)

The rotary table (6) preferably has at least one guide slot (63). The guiding member (41) which is located on the inner table (4) fits into the guide slot (63). This way, the contact between the inner table (4) and the rotary table (6) is enabled to remain as desired during lifting and rotation.

The rotary table (6) preferably has at least one upper cover (64). The upper cover (64) is preferably fixed on the rotary table (6) and forms a fixing surface on the rotary table (6). The dynamometer (D) fits onto the upper cover (64).

Preferably there are walls on the rotary table (6) that are perpendicular to the ground (FIG. 5). Preferably there are support members (65) on at least one or two of these walls. While the support members (65) enhance strength of the rotary table (6), they also enable that the weight of the load that is carried is distributed on the fixed plate (2) in a balanced manner.

The rotary table (6) preferably has at least one slot. The fixing and centering members (21) provided on the fixed plate (2) pass through the said slots provided on the rotary table (6). The rotary table (6) is fitted to the fixing and centering members (21) by means of the slots provided thereon and there it is locked and fixed. In the preferred embodiment of the invention, there are preferably four slots on the rotary table (6).

In the dynamometer rotary table (1) of the present invention, there is a slider (7) between the fixed plate (2) and the inner table (4). The slider (7) enables the inner table (4) to easily rotate on the fixed plate (2) by reducing the friction force during rotation movement. When the dynamometer rotary table (1) is fixed, no load acts on the slider (7) and the slider (7) is located only between the fixed plate (2) and the inner table (4). When the lifters (5) start to lift the rotary table (6), load starts to act on the sliders (7) and with the rotation movement, the sliders (7) enable the inner table (4) to easily move on the fixed plate (2). Different structures can be used as sliders (7). In a preferred embodiment of the invention, circular balls are used as the slider (7). In this embodiment, the slider balls (7) transfer the load acting on the inner table (4) to the fixed plate (2), and by rotating when the rotation starts, enable the movement to be easier. In an alternative embodiment of the invention, oil or a mechanical structure that facilitates rotation movement can be used as the slider (7). In an alternative embodiment of the invention, the slider (7) is located on the base of the inner table (4) or on the fixed plate (2).

In the dynamometer rotary table (1) of the present invention, there is preferably at least one lock unit (8) on the rotary table (6). The lock unit (8) preferably has at least one connecting member (81). There is at least one slot on the connecting member (8). Locking is performed via the slot. The connecting member (81) is fixed on the rotary table (6). The lock unit (8) fits onto the connecting member (81). The lock bolt fits into the slot provided on the connecting member (81). When locking will be performed, the lock bolt passes through the slot and fits into the fixing and centering member (21) provided on the fixed plate (2). When the lock bolt rotates, it is positioned such that it will not get dislocated from the fixing and centering member (21). This way, the rotary table (6) is fixed on the fixed plate (2) by means of the lock unit (8). In the preferred embodiment of the invention, a clamp is used as the lock unit (8). Locking is performed via the clamp. The clamp (8) is mounted on the rotary table (6) via a connecting member (81). When the dynamometer rotary table (1) is to be rotated, a signal is transmitted to the clamp (8) manually or automatically. The clamp (8) cancels the force it applies between the fixed plate (2) and the connecting member (81) and by opening of the lock the rotary table (6) is released. When it is going to be locked again, the clamp (8) applies a force between the fixed plate (2) and the connecting member (81) again upon receiving the signal transmitted thereto, and the rotary table (6) is mounted to the fixed plate (2).

The dynamometer (D) is mounted on the rotary table (6) via positioning bolts (9). The position of the dynamometer (D) can be adjusted precisely by means of the positioning bolts (9).

The dynamometer rotary table (1) is mounted to the ground via the fixed plate (2). The lower fixing member of the shaft (31) and the upper fixing member of the shaft (32) are mounted on the fixed plate (2). In an alternative embodiment of the invention, a single shaft fixing member is used in place of the lower fixing member (31) and the upper fixing member (32). The shaft and reducer (3) are mounted on the shaft fixing members (31, 32). Then the inner table (4) is seated on the fixed plate (2). The inner table (4) may move on the fixed plate (2) as long as the lock unit (8) is not locked. There are lifters (5) on the inner table (4). There is a rotary table (6) on the inner table (4). The slots provided on the rotary table (6) fit over the fixing and centering members (21) provided on the fixed plate (2). The connecting members (81) are located on the fixing and centering members (21). There is a lock unit (8) on the connecting members (81). When the lock unit (8) is locked, the rotary table (6) and the fixed plate (2) are fixed so as to engage each other firmly. There is a dynamometer (D) on the upper cover (64) of the rotary table (6).

When the dynamometer rotary table (1) is fixed and locked, the lock unit (8) applies a force between the fixed plate (2) and the connecting member (81) and the rotary table (6) remains stationary on the fixed plate (2). When the dynamometer (D) is going to be rotated, the lock unit (8) does not apply a force between the fixed plate (2) and the connecting member (81). This way, there is no fixing force between the fixed plate (2) and the rotary table (6). The lifters (5) located on the inner table (4) operate and uplift the rotary table (6). At this point, load acts on the sliders (7) located between the inner table (4) and the fixed plate (2). Then the shaft and reducer (3) are activated and they provide the force required for rotation. Rotation movement starts. The rotary table (6) and the inner table (4) start to rotate together. Rotation movement takes place on the sliders (7). The shaft and reducer (3) stop when the dynamometer (D) comes to the place where it will be repositioned. When the reducer (3) stops, movement of the rotary table (6) stops as well. The lifters (5) lower the rotary table (6). The connecting member (81) is seated on the fixing and centering member (21). The lock unit (8) locks these two members (81, 21) to each other and thus the rotary table (6) and the fixed plate (2) are fixed to each other.

While the dynamometer rotary table (1) of the present invention may be operated completely remotely via a control unit (K), it may as well be operated manually by the help of buttons. The dynamometer (D) is rotated safely and automatically by the help of the sensors provided on the fixing and centering member (21), inner table (4), rotary table (6), lock unit (8) and connecting member (81).

The invention claimed is:

1. A dynamometer rotary table, which moves and brings a dynamometer to a required position according to a test that will be conducted, comprising:
   at least one fixed plate which is seated on a ground,
   at least one reducer which generates a rotation force and enables rotation,
   at least one rotary table which is lifted to a preferred height by a lifter and which changes position of the dynamometer (D) by rotating with a force it receives from the reducer;
   wherein at least one inner table is located between the fixed plate and the rotary table and moves together with the rotary table.

2. The dynamometer rotary table according to claim 1, wherein the fixed plate provides a leveled and balanced surface relative to the ground and comprises at least two fixing and centering members.

3. The dynamometer rotary table according to claim 2, wherein the fixing and centering member is in a form of a conical piece having a slot thereon.

4. The dynamometer rotary table according to claim 2, wherein the rotary table comprises slots through which the fixing and centering members are provided on the fixed plate pass.

5. The dynamometer rotary table according to claim 2, wherein at least one lock unit is located on the rotary table and performs locking by having a lock bolt fit into the fixing and centering member provided on the fixed plate.

6. The dynamometer rotary table according to claim 5, wherein the lock unit fixes the fixed plate and the rotary table to each other by locking via applying force between the fixed plate and a connecting member.

7. The dynamometer rotary table according to claim 1, wherein at a bottom of the fixed plate, there are feet whose heights are adjustable, and the fixed plate has a quadrilateral, circular or elliptical geometry.

8. The dynamometer rotary table according to claim 1, wherein a lower fixing member of a shaft and an upper fixing member of the shaft are located on the fixed plate and enable the shaft and the reducer to be fixed to the fixed plate.

9. The dynamometer rotary table according to claim 1, wherein at least one guiding member enables the inner table to move synchronously with the rotary table.

10. The dynamometer rotary table according to claim 9, wherein the rotary table comprises a guide slot into which the guiding member located on the inner table fits.

11. The dynamometer rotary table according to claim 1, wherein the inner table is seated on the fixed plate with respect to a center of the fixed plate, and comprises a slot through which the lower and upper fixing members of the shaft pass.

12. The dynamometer rotary table according to claim 1, wherein the inner table has vertical and horizontal sections and has walls on two or four sides thereof which are perpendicular to the ground.

13. The dynamometer rotary table according to claim 1, wherein the inner table has the lifter that lifts and lowers a load acting thereon to the preferred height.

14. The dynamometer rotary table according to claim 1, wherein the inner table has at least four lifters that are mounted at parts near vertical or long sides thereof.

15. The dynamometer rotary table according to claim 1, wherein the lifter is a hydraulic or pneumatic piston.

16. The dynamometer rotary table according to claim 1, wherein the rotary table is placed on the fixed plate and the inner table, and moves on the fixed plate together with the inner table.

17. The dynamometer rotary table according to claim 1, wherein the rotary table moves on the fixed plate with a momentum it receives from the shaft and the reducer unless there is any locking.

18. The dynamometer rotary table according to claim 1, wherein the rotary table has a service window.

19. The dynamometer rotary table according to claim 1, wherein the rotary table comprises at least one lifting piece seated on the inner table and lifters, the at least one lifting piece is located on side walls of the rotary table, and transfers a lifting force applied by the lifters.

20. The dynamometer rotary table according to claim 1, wherein the rotary table comprises at least one upper cover which is used as a carrying surface and on which the dynamometer (D) is seated.

21. The dynamometer rotary table according to claim 1, wherein a slider is located between the fixed plate and the inner table, and enables the inner table to easily rotate on the fixed plate by reducing a friction force during rotation movement.

22. The dynamometer rotary table according to claim 21, wherein the slider is a circular ball.

23. The dynamometer rotary table according to claim 21, wherein the slider is located on a base of the inner table or on the fixed plate.

24. The dynamometer rotary table according to claim 1, wherein positioning bolts mount the dynamometer (D) onto the rotary table.

* * * * *